United States Patent
Schoppel et al.

(10) Patent No.: US 8,634,967 B2
(45) Date of Patent: Jan. 21, 2014

(54) ELECTROHYDRAULIC PRESSURE CONTROL ARRANGEMENT AND METHOD FOR PRESSURE CONTROL

(75) Inventors: Georg Schoppel, Lohr am Main (DE); Roland Gerhart, Hafenlohr (DE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 13/040,683

(22) Filed: Mar. 4, 2011

(65) Prior Publication Data

US 2012/0022704 A1   Jan. 26, 2012

(30) Foreign Application Priority Data

Mar. 6, 2010  (DE) .......................... 10 2010 010 506

(51) Int. Cl.
*G05D 16/00* (2006.01)
(52) U.S. Cl.
USPC .......................... 700/301; 700/282
(58) Field of Classification Search
USPC ................. 700/41, 42, 43, 282, 301
See application file for complete search history.

(56) References Cited

U.S. PATENT DOCUMENTS

| | | | |
|---|---|---|---|
| 6,234,144 B1 * | 5/2001 | Yamaguchi et al. | 123/399 |
| 6,330,483 B1 * | 12/2001 | Dailey | 700/28 |
| 6,343,235 B1 * | 1/2002 | Hausen et al. | 700/42 |
| 6,697,682 B2 * | 2/2004 | Dozono et al. | 700/55 |

OTHER PUBLICATIONS

Bosch Rexroth AG, Proportional Pressure Relief Valve, Direct Operated, Without/With Integrated Electronics (OBE), RD 29162, Product Datasheet, 16 pages, Germany, Aug. 2007.
Daniel Kotzian, Identification of Parameters of a Pressure Control Valve using Algebraic Methods, Dissertation, pp. 106-109, Friedrich-Alexander University, Department of Control Engineering, 5 pages, Germany, Oct. 2007.

* cited by examiner

*Primary Examiner* — Carlos Ortiz Rodriguez
(74) *Attorney, Agent, or Firm* — Maginot, Moore & Beck

(57) ABSTRACT

An electrohydraulic pressure control arrangement comprises a proportional pressure valve and a control loop structure. The control loop structure has a control path through which an actuating variable is fed to an actuating input of the proportional pressure valve starting from a setpoint pressure value. A pressure sensor detects an actual pressure value at a connection of the proportional pressure valve. A system model of a pressure valve assigns an estimated pressure value to the setpoint pressure value, and a subtraction element determines a control error as the difference between the estimated pressure value and the actual pressure value. A weighting element subjects the control error to a weighting operation and thus determines a weighted control error. The weighting element is designed such that relatively large control errors are attenuated to a greater extent than relatively small control errors.

12 Claims, 3 Drawing Sheets

ELECTROHYDRAULIC PRESSURE CONTROL ARRANGEMENT AND METHOD FOR PRESSURE CONTROL

BACKGROUND

This application claims priority under 35 U.S.C. §119 to German patent application no. 10 2010 010 506.6, filed Mar. 6, 2010 in Germany, the disclosure of which is incorporated herein by reference in its entirety.

The disclosure relates to an electrohydraulic pressure control arrangement for controlling the pressure of a pressure medium, and to a method for pressure control. The electrohydraulic pressure control arrangement comprises a proportional pressure valve and a control loop structure. The control loop structure has a control path through which an actuating variable is fed to an actuating input of the proportional pressure valve starting from a setpoint pressure value. A pressure sensor detects an actual pressure value at a connection of the proportional pressure valve. A system model of a pressure valve assigns an estimated pressure value to the setpoint pressure value, and a subtraction element determines a control error as the difference between the estimated pressure value and the actual pressure value.

A pressure control arrangement of this kind for a proportional pressure limiting valve without or with integrated electronics is known from the company publication Rexroth, Boschgroup RD 29162, dated August 2007. Different characteristic curves between the pressure in the connection region P and the volumetric flow rate in 1/min for different pressure stages are also published in this company publication, with the characteristic curves clearly showing that, in the case of a real proportional pressure valve, the pressure in the connection P is dependent on the volumetric flow rate through the pressure valve. In the case of an idealized system model however, the pressure in the connection P is independent of the volumetric flow rate through the valve, and this means that, in contrast to the real proportional pressure valves, the characteristic curve runs horizontally in the ideal case.

Furthermore, a dissertation from the Department of Control Engineering, Friedrich-Alexander University, Erlangen-Nuremberg, Identification of Parameters of a Pressure Control Valve using Algebraic Methods, by Daniel Kotzian, 2007, discloses that setpoint pressure characteristic curves of a real proportional pressure valve disadvantageously exhibit, despite a dither, pressure hysteresis which is undesirable for operation of proportional pressure valves, and therefore an additional controller, which is intended to maintain the setpoint pressure at different volumetric flow rates, should be provided. However, in the event of large control errors, there is a risk of any disturbances or oscillation stimuli, in particular when the pressure which is actually reached deviates to a great extent from the ideal horizontal P-Q characteristic curve as a function of the quantity of fluid which is intended to be delivered or discharged in the case of the known additionally controlled pressure limiting valve. This error is the result of hydromechanics in the valve and can, in extreme cases, lead to stimulation and build-up of oscillations in the pressure control arrangement.

Known controller structures of this kind can, for all intents and purposes, be optimized only in response to small signal behavior, and for this reason a disadvantageous control loop behavior is often established at high setpoint value amplitudes. This disadvantageous control loop behavior is usually counteracted using control loop dynamics which are set to be low. A further option is to mask large control errors for the controller by a correspondingly limited passband. However, this presents the problem that the passband has to be selected to be very large for reliable functioning of the control loop over the entire operating range, as a result of which the intrinsically positive effect of such a passband is attenuated again.

The object of the disclosure is to provide an electrohydraulic pressure control arrangement with improved control loop behavior for proportional pressure valves, and a method for pressure control using the electrohydraulic pressure control arrangement.

This object is achieved by way of the subject matter set forth herein. Advantageous developments of the disclosure are set forth herein as well.

The disclosure provides an electrohydraulic pressure control arrangement for controlling the pressure of a pressure medium, and a method for pressure control. The electrohydraulic pressure control arrangement comprises a proportional pressure valve and a control loop structure. The control loop structure has a control path through which an actuating variable is fed to an actuating input of the proportional pressure valve, starting from a setpoint pressure value. A pressure sensor detects an actual pressure value at a connection of the proportional pressure valve. A system model of a pressure valve assigns an estimated pressure value to the setpoint pressure value, and a subtraction element determines a control error as the difference between the estimated pressure value and the actual pressure value. A weighting element subjects the control error to a weighting operation and thus determines a weighted control error. A controller modifies and modifies a signal on the control path, in the sense of minimizing the weighted control error, during operation on the basis of the weighted control error. The weighting element is designed such that relatively large control errors are attenuated to a greater extent than relatively small control errors.

This electrohydraulic pressure control arrangement has the advantage that the controller compensates the control errors by means of a feedback branch and the control errors are weighted by means of a weighting function during the feedback operation. In this case, the passband of the weighting function can selectively be permanently set or automatically tracked as a function of the volumetric flow rate and by means of a volumetric flow rate estimation of the actual valve throughflow rate from an actual controller output signal and an actual pressure value. The electrohydraulic pressure control arrangement according to the disclosure and the method for pressure control improve the control loop behavior primarily in the large signal range in the case of pressure valves with pressure control. An advantageous solution with which, for example, reverberation is avoided, primarily in the large signal range, is provided by calculating the difference between an estimated pressure value and an actual pressure value and by weighting by means of an implemented characteristic map or an approximating function as a control variable for the required passband. To this end, adapting the passband ensures that the control loop function is always carried out with the minimum possible passband, and so the desired improvement in the control loop behavior is determined.

In a preferred embodiment of the disclosure, the volumetric flow rate estimation is realized as a characteristic map or by a function which approximates the characteristic map. A function of this kind can be represented, for example, for the estimated volume value $Q_S$ by the following equation:

$$Q_S(U_R, P_A) = a \cdot U_R + b \cdot P_A + c,$$

where a, b and c can be coefficients relating to the controller output signal $U_R$, the actual pressure value $P_A$ and relating to the estimated volume value $Q_S$. In this case, this function or else the characteristic map is matched to the respective proportional pressure valve.

In a further embodiment of the disclosure, an anti-windup block is provided in the pressure control arrangement, said anti-windup block limiting an I component of the controller which may be present when actuating signal limitations are present. To this end, the anti-windup block has a limiter and a proportional element which is connected downstream via a coupling point, the output signal from said proportional element being connected to the PI controller input via a further subtraction element. This embodiment effectively prevents the I component of the controller from "running away" by means of actuating signal limitations.

A method for pressure control in an electrohydraulic pressure control arrangement which has a proportional pressure valve, which reacts to a prespecified setpoint pressure value, comprises the following method steps.

First of all, an actuating variable $U_R$ is fed to an actuating input of the proportional pressure valve via a control path starting from a setpoint pressure value $U_{Pset}$. An actual pressure value is detected at a connection of the proportional pressure valve by means of a pressure sensor. Furthermore, the setpoint pressure value is assigned to an estimated pressure value by means of a system model of the pressure valve.

A control error in the form of the difference between the estimated pressure value and the actual pressure value is then determined by means of a subtraction element and the control error is subjected to a weighting operation in order to form a weighted control error. Furthermore, the weighted control error is minimized by modifying a signal on the control path by means of a controller, with a weighting element being designed such that relatively large control errors are attenuated to a greater extent than relatively small control errors.

A characteristic map or a function which approximates the map of characteristic curves can be stored in order to estimate a setpoint volumetric flow rate. An I component, which may be present, of a controller can be limited by an anti-windup block in the pressure control arrangement when actuating signal limitations are present. It is also possible, in the anti-windup block, for a proportional element to be connected downstream of a limiter via a coupling point, the output signal from said proportional element being fed to a controller input via a further subtraction element.

BRIEF DESCRIPTION OF THE DRAWINGS

The disclosure will now be explained in greater detail with reference to the attached figures.

DETAILED DESCRIPTION

Figure 1:
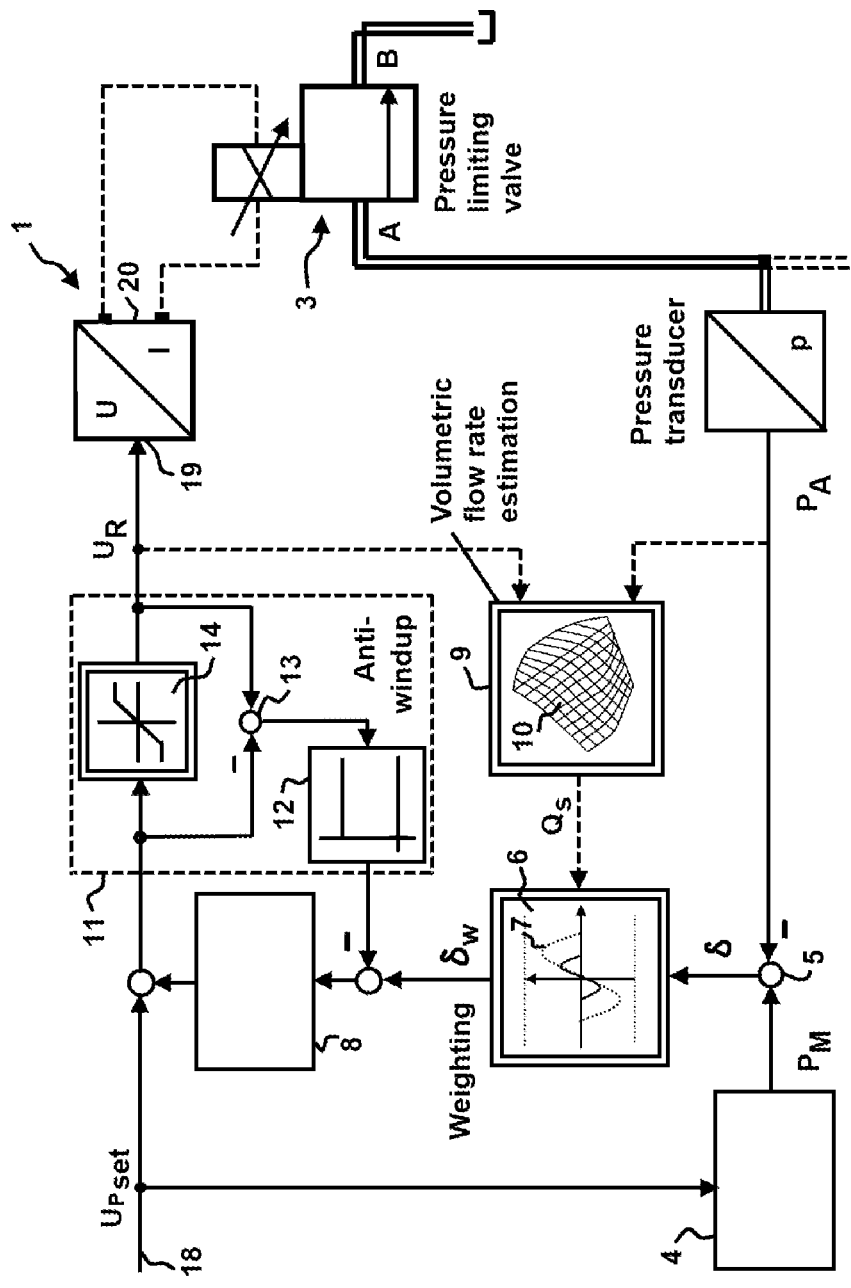
FIG. 1 shows a schematic block diagram of a pressure control structure according to one embodiment of the disclosure.

FIG. 1 shows a schematic block diagram of an electrohydraulic pressure control arrangement for controlling the pressure of a pressure medium using a proportional pressure valve 3 and a control loop structure 1 according to one embodiment of the disclosure. In this case, a prespecified setpoint pressure value in the form of a voltage $U_{Pset}$ representing a setpoint pressure is applied to the input 18 of the control loop structure 1. An actuating variable $U_R$ is fed to an actuating input 19 of the proportional pressure valve 3 through a control path starting from the setpoint pressure value $U_{Pset}$. The voltage $U_{Pset}$ representing a setpoint pressure is also fed to a system model 4 which reflects the desired relationship between the voltage $U_{Pset}$ representing a setpoint pressure and the pressure $p_A$. The system model 4 calculates the expected pressure $p_M$ of an ideal pressure valve, which does not depend on the volumetric flow rate Q through the pressure valve, from the voltage $U_{Pset}$ representing a setpoint pressure. However, the behavior of a real controlled pressure valve 3, which is shown in FIG. 1, deviates from this ideal system model 4, it being possible to minimize the control error "d" with the aid of a PI controller, for example.

In the case of proportional pressure valves, the pressure which is actually reached deviates to a great extent from an ideal horizontal P-Q characteristic curve as a function of the quantity of fluid which is intended to be supplied or discharged. A subtraction element 5 detects the pressure difference between the estimated pressure value $p_M$ and the actual pressure value $p_A$ and supplies a control error d to a multiplier for weighting the control error d with a weighting function 7, with which the control error d is multiplied or offset to form a weighted control error $d_W$.

This weighting function 7 in the multiplier 6 has a passband which, for its part, is set by a volumetric flow rate estimation 9 with the aid, for example, of a characteristic map 10, and therefore the volumetric flow rate-dependent band is selected to be narrow in such a way that large signal changes and the associated risk of oscillation stimulation are masked or suppressed.

A control error $d_W$ which is weighted in this way is fed to a controller 8, which correspondingly modifies the voltage $U_{Pset}$ representing a setpoint pressure. At the same time, the controller 8 is protected, by an anti-windup block 11, against the I component, which may be present, of the controller "running away" when actuating signal limitations are present, said anti-windup block comprising a proportional element 14 and a limiter 12 and also a coupling point 13 which is arranged therebetween, with the weighted control error being fed to the controller 8 via a further coupling point 15. The control output signal $U_R$ which is protected in this way is fed to a current output stage 20.

Figure 2:
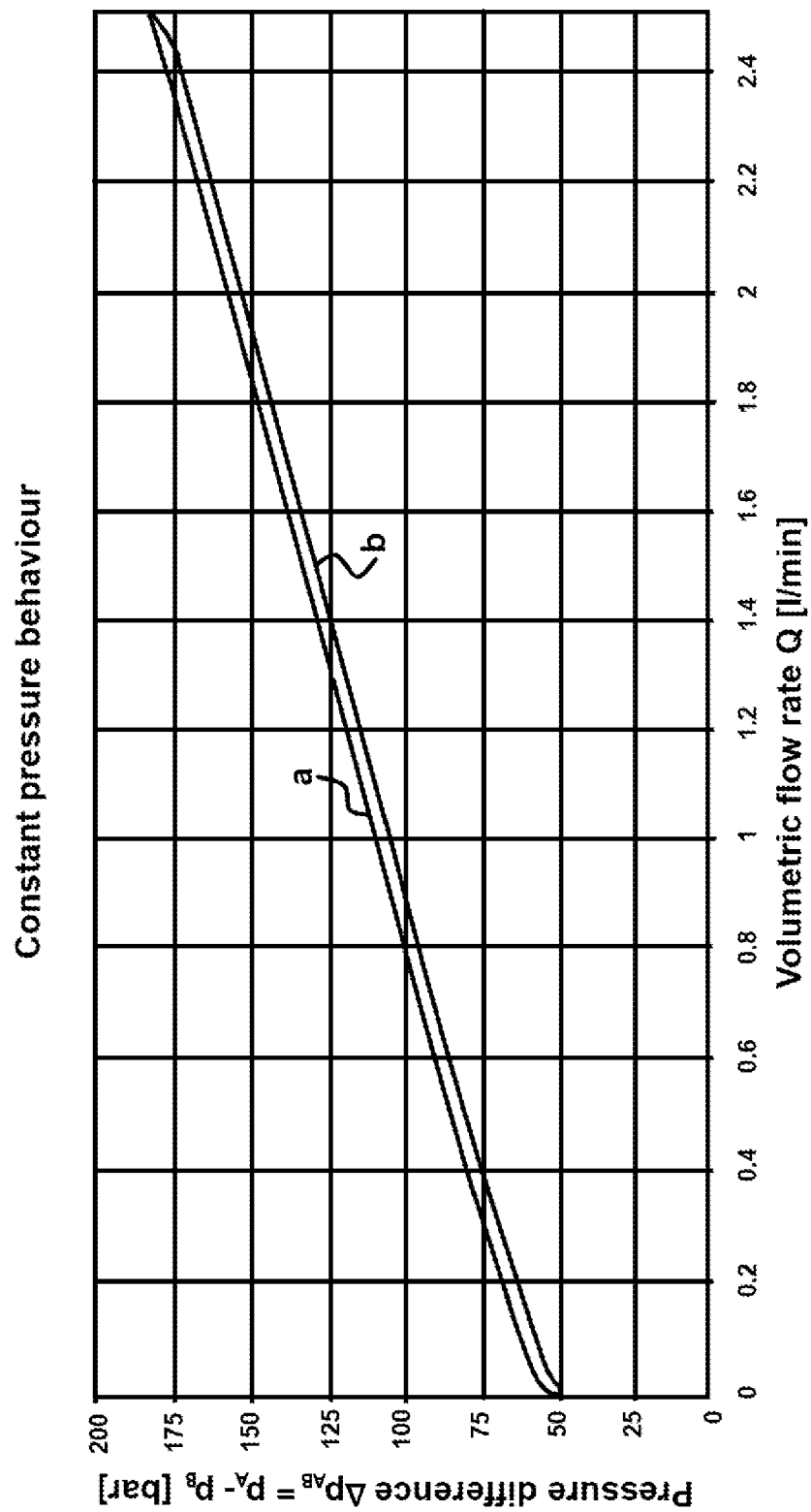
FIG. 2 shows a schematic graph of the relationship between the pressure difference $\Delta p_{AB}=p_A-p_B$ and a volumetric flow rate Q through a pressure valve.

FIG. 2 shows a schematic graph of the relationship between the pressure difference $\Delta p_{AB}=p_A-p_B$, which is present between the connections A and B of a controllable pressure limiting valve 3 which is shown in FIG. 4, and the volumetric flow rate Q through the valve. This relationship is demonstrated using the example of a pressure difference $\Delta p_{AB}$ which is set at 100 bar at an initial volumetric flow rate Q of 0.8 l/min. Starting from this setting point Q=0.8 l/min, a control error which becomes considerably larger and which the controller has to correct is produced given constant pressure behavior at a volumetric flow rate which increases in arrow direction a or decreases in arrow direction b. This means that a weighting function has to be designed, in accordance with the abovementioned condition, such that at least the respective control error is allowed to pass. Starting from a selected setting point, the passband therefore has to be become larger as the distance increases.

Figure 3A:
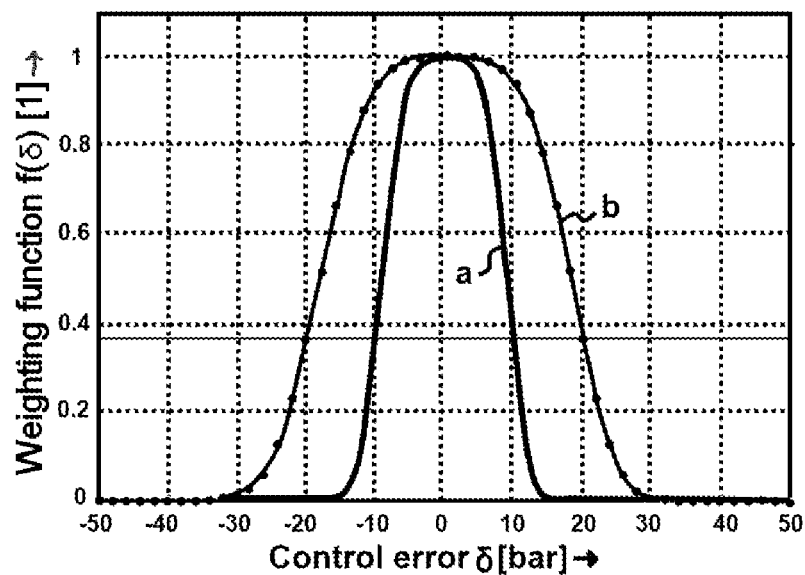
FIG. 3 shows schematic graphs of exemplary weighting functions f(d) and associated resulting weighted control errors $d_W=f(d)*d$.
Figure 3B:
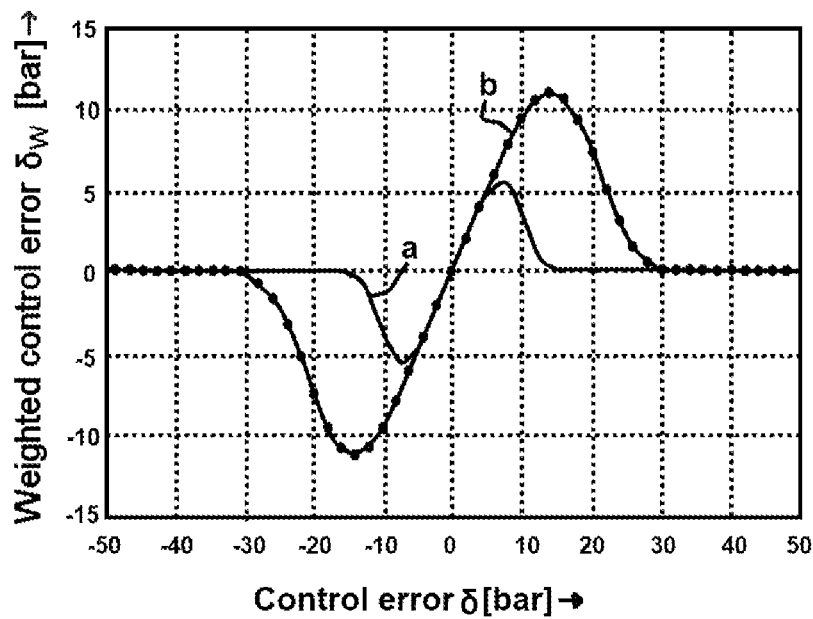

FIG. 3 shows, in FIGS. 3A and 3B, schematic graphs of exemplary weighting functions f(d) and associated resulting weighted control errors $d_W=f(d)*d$. FIG. 3A shows examples of possible weighting functions f(d). Suitable weighting functions f(d) are characterized, in principle, by the following properties:

f(d)=0 f(d) assumes a maximum value for d=0, and the value of f(d) is always below the maximum value for "large" d values.

However, areas of discontinuity in the weighting function should be avoided, since discontinuities could lead to unnecessary oscillation stimuli of the control loop when the weighting means are present. Therefore, the use of weighting functions which are selected, as shown in the examples of FIG. 3A, such that the weighted control error $d_W=f(d)*d$, and if possible for many of its derivatives, does not have any discontinuities caused by f(d) is particularly advantageous. The schematic profiles shown in FIG. 3A are defined by $$f(d)=_e-(d/D)^n,$$

where n in this embodiment is 4 and D, the passband, preferably lies between 5=D=80, and D=10 in the case of the illustrated weighting curve a, and D=20 in the case of the weighting curve b.

FIG. 3B shows, by way of the curves a and b, the assignments, which are associated with the weighting functions f(d) shown in FIG. 3A, of the weighted control errors $d_W$ given corresponding control errors d.

LIST OF REFERENCE NUMERALS

1 Electrohydraulic control loop structure
3 Proportional pressure valve
4 System model
5 Subtraction element
6 Multiplier
7 Weighting function
8 Controller
9 Estimation element or volumetric flow rate estimation
10 Characteristic map
11 Anti-windup block
12 Limiter
13 Coupling point
14 Proportional element
15 Coupling point
16 Controller input
18 Input of the pressure control arrangement
19 Actuating input
20 Current output stage
D Passband
d Control error
$d_W$ Weighted control error
$p_A$ Actual pressure value
$p_B$ Return pressure
$\Delta p_{AB}=p_A-p_B$ Pressure difference
$p_M$ Estimated pressure value according to the system model
Q Volumetric flow rate
$Q_S$ Volumetric flow rate
$U_{Pset}$ Voltage representing a setpoint pressure
$U_R$ Controller output signal

The invention claimed is:

1. An electrohydraulic pressure control arrangement for controlling the pressure of a pressure medium, comprising a proportional pressure valve and a control loop structure, with the control loop structure having:
   a control path through which an actuating variable is fed to an actuating input of the proportional pressure valve starting from a setpoint pressure value,
   a pressure sensor which detects an actual pressure value at a connection of the proportional pressure valve,
   a system model of a pressure valve, which system model assigns an estimated pressure value to the setpoint pressure value,
   a subtraction element which determines a control error as the difference between the estimated pressure value and the actual pressure value,
   a weighting element which subjects the control error to a weighting operation that attenuates the control error to produce a weighted control error, and
   a controller which receives the weighted control error and modifies the signal on the control path during operation on the basis of the weighted control error,
   wherein the weighting element is designed such that control errors that are outside of a parameterized passband are attenuated by a greater amount than control errors that are within the parameterized passband when producing weighted control errors.

2. The electrohydraulic pressure control arrangement according to claim 1, wherein the weighting element is designed to vary the passband as a function of a passage control signal during operation.

3. The electrohydraulic pressure control arrangement according to claim 2, wherein the passage control signal is determined such that it represents a volumetric flow rate through the proportional pressure valve, and
   wherein the passage control signal is obtained by means of an estimation element which determines the passage control signal as an estimated value for the volumetric flow rate starting from the actual pressure value and the actuating variable.

4. Electrohydraulic pressure control arrangement according to claim 3, wherein the volumetric flow rate estimation is realized as a characteristic map or a function which approximates the characteristic map.

5. The electrohydraulic pressure control arrangement according to claim 1, wherein the weighting element is characterized by weighting functions f(d) such that the weighted control error $d_w=f(d)*d$, where $d_w$ is the weighted control error and d is the control error, and
   wherein the weighting functions have the following properties:
   f(d) assumes a maximum value for d=0, and
   the value of f(d) is always below the maximum value for "large" d values.

6. The electrohydraulic pressure control arrangement according to claim 1, wherein the weighting element is defined by the weighting function $f(d)=_e-(d/D)^n$, where n is 4 and where D, as the passband, is between 5 and 80.

7. The electrohydraulic pressure control arrangement according to claim 1, wherein an anti-windup block is provided in the pressure control arrangement for the purpose of limiting an I component of the controller when actuating signal limitations are present.

8. The electrohydraulic pressure control arrangement according to claim 7, wherein the anti-windup block has a limiter and a proportional element which is connected downstream via a coupling point, the output signal from said proportional element being connected to the controller input via a further subtraction element.

9. A method for pressure control in an electrohydraulic pressure control arrangement, with the pressure control arrangement having a proportional pressure valve, which reacts to a prespecified setpoint pressure value, and with the following method steps being carried out in order to control control errors with respect to an idealized system model:

feeding an actuating variable to an actuating input of the proportional pressure valve via a control path starting from a setpoint pressure value, detecting an actual pressure value at a connection of the proportional pressure valve with a pressure sensor, assigning an estimated pressure value to the setpoint pressure value with a system model of a pressure valve, determining a control error in the form of the difference between the estimated pressure value and the actual pressure value with a subtraction element, determining a weighted control error using a weighting element which subjects the control error to a weighting operation that attenuates the control error to produce the weighted control error that is output to a controller, modifying a signal on the control path with the a controller based on the weighted control error, and wherein the weighting element is designed such that control errors that are outside of a parameterized passband are attenuated by a greater amount than control errors that are within the parameterized passband when producing weighted control errors.

10. The method according to claim 9, wherein a characteristic map or a function which approximates the characteristic map is stored for the purpose of determining a volumetric flow rate.

11. The method according to claim 9, characterized in that an I component of a controller is limited by an anti-windup block in the pressure control arrangement when actuating signal limitations are present.

12. The method according to claim 11, wherein, in the anti-windup block, a proportional element is connected downstream of a limiter via a coupling point, the output signal from said proportional element being fed to a controller input via a further subtraction element.

* * * * *